Dec. 25, 1962  W. H. LIND  3,070,621
CONTACTING OF SOLIDS AND GASES
Filed March 29, 1957
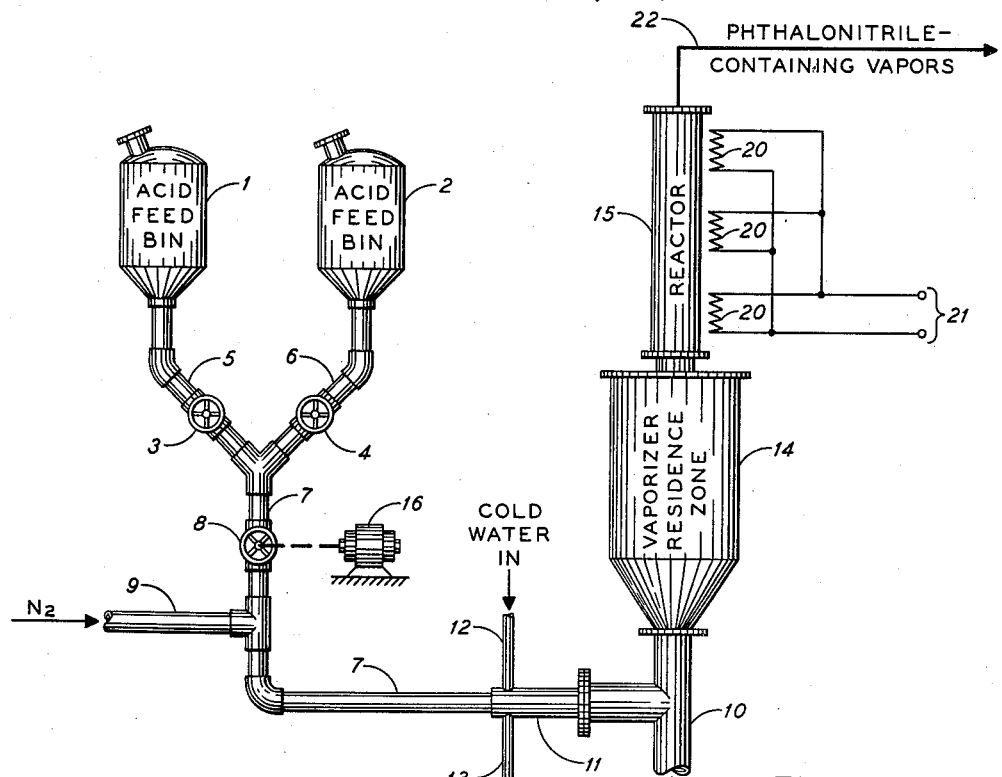
FIG.1
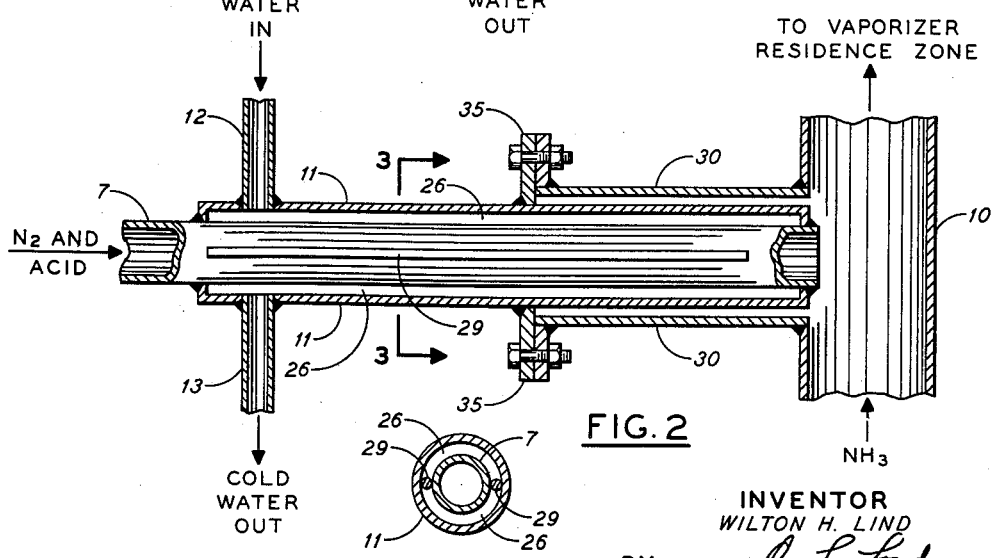
FIG.2
FIG.3
INVENTOR
WILTON H. LIND
BY
ATTORNEYS United States Patent Office 3,070,621
Patented Dec. 25, 1962

3,070,621
CONTACTING OF SOLIDS AND GASES
Wilton H. Lind, Walnut Creek, Calif., assignor to California Research Corporation, San Francisco, Calif., a corporation of Delaware
Filed Mar. 29, 1957, Ser. No. 649,470
4 Claims. (Cl. 260—465)

This invention relates to the contacting of solids with gases and, more particularly, to reaction processes wherein at least one particulate-form solid reactant is dispersed and vaporized in, and reacted with, a hot gaseous reactant.

Many processes include steps wherein particulate-form solid reactants are reacted with a heated gaseous reactant, for example, processes for the production of phthalonitrile, by contacting phthalic acid and hot gaseous ammonia. These processes can be accomplished, and frequently are accomplished, by melting the solid reactant and then by passing the hot gaseous reactant over the melted solid to vaporize it and accomplish the reaction. However, this conventional manner of obtaining the desired reaction has numerous disadvantages, including excessive undesirable side reactions and the formation of deposits of melted and semi-melted materials on the interior walls of various pieces of process equipment and in the lines leading thereto. In conventional processes for reacting phthalic acids with hot gaseous ammonia in a vaporizing zone or vaporizer, for example, there is produced a holdup of molten phthalic acid and ammonium phthalate in the equipment, with undesirably high resulting rates of decarboxylation and equipment corrosion. Furthermore, in such conventional processes, deposits that form on the vaporizer walls necessitate frequent shutdowns of the equipment to permit cleaning out of the deposits from the vaporizer.

In view of the foregoing, it is an object of the present invention to provide methods and apparatus for reacting at least one particulate-form solid reactant with a heated gaseous reactant by passing said solid reactant into contact with said gaseous reactant in a manner which avoids formation of deposits on equipment and connecting lines, and which minimizes side reactions and avoids other prior art problems.

In accordance with the present invention, there is provided a method of reacting solid particles of at least one first reactant with a gaseous second reactant, which comprises maintaining said gaseous reactant at a temperature substantially above the softening temperature of said particles, entraining said particles in a carrier stream of inert gas having a temperature below said softening temperature, and passing said inert gas and entrained particles into said gaseous reactant, whereby said particles are dispersed in said gaseous reactant and are reacted with and vaporized by said gaseous reactant.

The novel features of the present invention are set forth with particularity in the appended claims. The invention will best be understood, however, both as to organization and operation, and additional objectives and advantages thereof will be apparent, from the following description of a specific embodiment when read in connection with the accompanying drawing, in which:

FIG. 1 is a schematic illustration of one embodiment of apparatus and flow paths which may be used in practicing the present invention;

FIG. 2 is a partial sectional view of the water cooling portion of the system shown in FIG. 1; and FIG. 3 is a transverse sectional view of said water cooling system taken along the line 3—3 of FIG. 2.

The reaction of phthalic acids with ammonia to produce phthalonitriles is illustrative of a type of reaction to which the present invention advantageously may be applied. This reaction will be discussed in the following detailed description; however, it will be understood that the invention will be applicable to any process wherein a particulate-form reactant must be reacted with a gaseous reactant. Phthalonitriles prepared from phthalic acids, and particularly phthalonitriles prepared from isophthalic acid, terephthalic acid, or mixtures thereof, are particularly valuable as intermediates in the production of superior fiber-forming linear polymers. Phthalonitriles are also valuable as plasticizers and alkyd resin modifiers, as pesticides, and as intermediates in organic synthesis such as the manufacture of amines, acids, amides, and complex nitrogenous dye stuffs. The process problems involved in preparing nitriles from isophthalic acid, terephthalic acid, and mixtures thereof, are generally more difficult than the problems involved in preparing either aliphatic nitriles or ortho-phthalonitrile because of the higher boiling and melting points of isophthalic acid and terephthalic acid compared with the materials from which aliphatic nitriles and ortho-phthalonitrile are prepared. Therefore, when applied to the production of nitriles, the present invention has particular utility in the production of nitriles from isophthalic acid and terephthalic acid.

Referring now to FIG. 1, solid particulate-form isophthalic acid and terephthalic acid which may range, for example, from about 5 to 200 mesh, and preferably from about 10 to 100 mesh, may be stored in acid feed bins 1 and 2, respectively, each of which may be operated, for example, under a pressure of about 20–60 p.s.i.g. By means of valve 3 in line 5 and valve 4 in line 6, acid from either or both of the acid feed bins 1 and 2 may be passed into line 7 and thence therethrough at a desired rate governed by means of star feeder valve 8 driven by motor 16. As the acid particles pass through valve 8, they are entrained in a stream of an inert carrier gas, for example, nitrogen, passed through line 9 at a temperature below the softening point of the acid particles, for example, at a temperature of from about 60° to 400° F., in the case of isophthalic and terephthalic acids, and at a rate that is so related to the acid feed rate that the acid particles entrained in the inert carrier gas are well dispersed therein. The inert carrier gas may be introduced through line 9 into line 7 at a pressure, for example, of about 20–60 p.s.i.g. The acid particles are carried by the inert carrier gas through line 7 to the juncture of line 7 with line 10, where they are discharged together with the inert carrier gas into a hot ammonia stream flowing through line 10 in the direction indicated, the ammonia being passed through line 10 at a rate which may range from about 2 moles to 25 moles of ammonia per mole of acid. As the acid particles meet the hot ammonia stream, which may be maintained at a temperature, for example, of about 800° F. to 1000° F., a substantial portion of the acid is believed to substantially immediately react with the ammonia to form ammonium phthalate, which in turn is substantially immediately vaporized in the hot ammonia. This substantially immediate conversion of the acid particles to vapor form eliminates deposits on metal lines and equipment of melted and liquid product intermediates, which enter into undesirable side reactions, particularly when catalyzed by metal during contact therewith. The hot ammonia stream may be introduced into line 10 at a pressure, for example, of about 20–60 p.s.i.g. At least a portion of line 7 nearest the juncture of line 7 with line 10 is surrounded by a cooling jacket 11 supplied by cold water entering through line 12 and leaving through line 13. This cooling of line 7 is accomplished to prevent heat transfer from heated ammonia line 10 from causing acid particles in line 7 to soften or melt before they are discharged into line 10. Further details of the cooling arrangement will be described in connection with FIGURES 2 and 3.

Still referring to FIG. 1, although a substantial portion of the solid acid particles entering line 10 through line 7 is substantially immediately reacted and vaporized in the hot ammonia flowing through line 10, a minor portion of those particles may not become completely reacted and vaporized for a short time following their introduction into the hot ammonia stream in line 10; therefore, the ammonia-nitrogen-acid mixture in line 10 is passed into vaporizer residence zone 14, provided to permit completion of the vaporization of any vaporizable materials not vaporized substantially immediately upon contact of the acid particles with the ammonia in line 10. Vaporizer residence zone 14 is maintained at a temperature sufficiently high so that the contents of zone 14 may be passed into dehydration reactor 15 at a temperature, for example, between about 600° F. and 800° F., and preferably between about 650° F. and 750° F. Vaporizer residence zone 14 may be heated by external heating means (not shown) in order to compensate for ambient losses and maintain the desired temperatures.

From vaporizer residence zone 14 the contents thereof are passed into dehydration reactor 15 which is provided with suitable heating means, for example, electric heaters 20, energized from a voltage source 21, to maintain the temperature in reactor 15 at about, for example, 700° F. to 900° F., and preferably from about 750° F. to 850° F. The phthalic acid and ammonia entering reactor 15 are reacted together therein in the presence of a dehydration catalyst to produce the desired phthalonitrile. The space velocity of the acid charged to reactor 15 may be from about 10 pounds per cubic foot per hour to about 350 pounds per cubic foot per hour, and preferably from about 20 to 150 pounds per cubic foot per hour.

The dehydrating catalysts which may be employed in reactor 15 are known to the art and have been described in such texts as "Catalysis," by Berkman, Morrell and Egloff. For present purposes catalysts such as activated alumina, silica and thoria, which are stable at the temperatures of operation, are particularly satisfactory. Other catalysts include oxides of zirconium, beryllium, tungsten, and vanadium, and basic aluminum phosphate, basic aluminum sulfate and phosphoric acid. If a support for the catalyst is desired, such materials as Alundum, and the like, may be employed.

The vaporous reaction products formed in reactor or zone 15 are passed from zone 15 through line 22 to a suitable recovery system for the recovery of phthalonitrile from the reaction vapors. The recovery system, which is not shown, may comprise, for example, solvents for dissolving phthalonitrile out of the reaction vapors or means for crystallizing the phthalonitrile from the reaction vapors. Line 22 is provided with suitable means, not shown, if necessary to insure that the materials in line 22 remain in vapor form until they reach the phthalonitrile recovery system, for example, until they contact a suitable solvent for the phthalonitrile. These line 22 vapors preferably are maintained at a temperature, for example, from about 600° F. to 800° F., a more desirable range being from about 650° F. to 725° F., to minimize meta-cyanobenzamide production.

Referring now to FIG. 2, there shown, partially in section, are details of the jacketing system provided around line 7 to maintain the contents of line 7 throughout the length of that line at a temperature, preferably between about 60° F. and 400° F., below the threshold temperature at which any acid particles in line 7 will begin to soften, melt, or sinter. Line 7 is surrounded by a water jacket 11 which provides a space 26 between line 7 and jacket 11. Cold water is passed into space 26 through line 12 and is withdrawn from space 26 through line 13. In order to prevent the cold water from passing in a direct route from line 12 to line 13 without circulating throughout space 26, a barrier 29 is provided on each side of line 7, as shown in FIG. 3. This barrier may be a wire or rod having a diameter of approximately the same as the width of space 26 and may be tack-welded to line 7. Cold water entering line 12 thus must pass through the upper portion of space 26 toward ammonia line 10 and thence around the ends of rods 29 and into the lower portion of space 26, through which it may pass to exit line 13. In this manner nitrogen-acid line 7 may be maintained at a desired temperature down to the juncture of line 7 with line 10, and thereby acid particles in line 7 may be prevented from reaching their threshold melting or softening temperature until they are discharged into the hot ammonia flowing through line 10. In order to prevent heat transfer by conduction directly from the walls of line 10 to water jacket 11, flanged annular member 30 is provided, and the water jacket assembly is bolted thereto by means of flanges 35 secured to jacket 11. Thus, heat transferred by conduction from the walls of line 10 to water jacket 11 is directed to water jacket 11 at a point well away from the juncture of lines 7 and 10, where the greatest cooling problem is involved because substantial heat transfer by convection occurs at that juncture.

Referring now to FIG. 3, there shown is a transverse section of the cooling jacket assembly of FIG. 2 taken along the line 3—3 of FIG. 2. It may be seen from the section line 7 and jacket 11 and thus force cooling water entering the upper portion of space 26 to travel the length of space 26 before it can enter the lower portion of space 26.

From the foregoing it may be seen that the phthalic acid particles may be held at a temperature below their threshold melting or softening temperature until the moment when they are discharged into the hot ammonia stream in which they are substantially immediately dispersed, reacted therewith, and vaporized.

This is in marked contrast with prior art methods for reacting solid phthalic acid particles with ammonia, for example, by melting the solid acid and then vaporizing the acid by passing ammonia through the melt and applying heat to the melt. This prior art practice produces at least two undesirable results: (1) The resulting holdup of molten phthalic acid and ammonium phthalate produces high decarboxylation rates, other side reactions, and high equipment corrosion rates; (2) deposits that form on the walls of lines and equipment necessitate frequent shutdowns for cleaning purposes.

Thus, a significant advantage over prior art methods of reacting solid phthalic acid particles with ammonia is obtained, namely, the particles pass into a vapor form in the hot reactive gas so quickly that no intermediate reaction products in melted and liquid forms contact metal portions of the system. Such contact, because of catalytic action of the metal, would result in high decarboxylation rates, other side reactions, and high equipment corrosion rates. Further, the absence of such intermediate molten and liquid forms, except possibly momentarily in a brief transitory interval, eliminates the prior art problem of accumulations of these forms depositing on the walls of equipment and connecting lines.

Those skilled in the art will observe other advantages of the present invention in addition to the avoidance of the foregoing prior art difficulties. According to the present invention, the hot ammonia into which the solid acid particles are vaporized may supply substantially all of the heat of vaporization, although some heat may be carried into the system by the nitrogen stream so long as the temperature of the nitrogen stream is maintained below the softening temperature of the acid particles. It will also be seen that the presence of nitrogen prevents ammonia from contacting the acid particles at a location other than the main ammonia stream, i.e., because of the presence of the nitrogen, the ammonia cannot pass into any portion of the nitrogen line and produce caked masses of ammonium phthalate and generate heats of reaction. Further, the phthalic acid particles vaporize extremely rapidly when they are discharged into the ammonia stream, because in their dispersed state in the nitrogen carrier gas they present maximum exposed surface areas to the hot ammonia.

The flow rate and temperature of the hot ammonia stream may be determined by a conventional heat balance, and may be adjusted to provide the desired temperature for the materials entering the dehydration reactor after substantially adiabatic vaporization of the phthalic acid in the hot ammonia has occurred. The flow rate of the nitrogen stream may be determined by the particle size and physical properties of the solid to be conveyed thereby, giving due consideration to the amount of solid to be conveyed and the degree of dispersion in the nitrogen that is desired. In the construction of the equipment shown in FIG. 1 for a process for reacting phthalic acids with ammonia to produce phthalonitriles, it is desirable that at least the vaporizer residence zone 14, the portions of lines 10, 12 and 13 shown in FIG. 1, the water jacketing system, and a portion of line 7 from its juncture with line 10 to a location outside water jacket 11 be constructed of Hastelloy B or C, because these materials do not appreciably catalyze decarboxylation of phthalic acids and because they are extremely resistant to corrosion that can be caused during the reactions involved. The remainder of the equipment shown in FIG. 1 may be constructed, for example, of type 34 stainless steel, provided to resist corrosion by phthalic acid (which at times may be high in moisture content) and to avoid pickup of metal by the phthalic acid. The stainless steel provided for reactor 15 offers resistance to corrosion caused by hot ammonia and phthalic acid vapors.

The following examples will serve to further illustrate the application of the present invention to the production of isophthalonitrile by contacting particulate-form isophthalic acid with hot gaseous ammonia in a process arranged as shown in FIG. 1, as compared with the production of isophthalonitrile by contacting particulate-form isophthalic acid with hot gaseous ammonia by conventional methods not utilizing the inert carrier gas stream and jacketed cooling system employed in the arrangement shown in FIG. 1.

*Example 1*

In an arrangement similar to that shown in FIG. 1, except without the use of the cooled system shown for injecting isophthalic acid into hot ammonia, 70 runs of isophthalic acid were made at a 6 pounds per hour rate. The total resulting production of benzonitrile was 3.6 mole percent based on isophthalic acid. The benzonitrile production resulting from the last 11 runs was 2.8 mole percent based on isophthalic acid.

The isophthalonitrile yield was about 95 mole percent.

*Example 2*

Immediately following the processing set forth in Example 1, the equipment was arranged in accordance with the present invention as shown in FIG. 1 and 75 additional runs of isophthalic acid were made at the rate of 6 pounds per hour. The total benzonitrile production for the 75 additional runs was 1.4 mole percent based on isophthalic acid. The benzonitrile production for the first 10 of the 75 additional runs was 1.6 mole percent base on isopthalic acid.

The isophthalonitrile yield was about 97 mole percent.

From the foregoing examples, it may be seen that the use of the present invention substantially reduced side reactions as compared with conventional methods for producing isophthalonitrile by contacting isophthalic acid with hot gaseous ammonia, as evidenced by reduced production of the by-product benzonitrile. The decrease in the rate of benzonitrile production as a result of using the methods and apparatus of the present invention, as compared with the use of conventional methods and apparatus, is largely attributable to substantially adiabatic vaporization of the acid particles into the hot gaseous ammonia stream, which eliminates the catalysis of decarboxylation on the walls of lines and equipment that occurs in conventional methods when a melt phase of materials accumulates on those walls, and which reduces the residence time required in the vaporizing equipment. The reduction of benzonitrile is accompanied by a reduction in the amount of $CO_2$ that must be removed from the ammonia recycle stream when it is desired to separate ammonia from the effluent from the dehydration reactor and recycle the separated ammonia back to the fresh ammonia stream.

From the foregoing it may be seen that the present invention operates in a novel and effective manner to substantially reduce side reactions and eliminate formation of deposits on equipment and connecting lines in processes wherein at least one particulate-form solid reactant must be vaporized in and reacted with a gaseous reactant.

Although only certain specific arrangements and modes of construction and operation of the present invention have been described and illustrated, numerous changes could be made in those arrangements and modes without departing from the spirit of the invention and all such changes that fall within the scope of the appended claims are intended to be embraced thereby.

I claim:

1. The method of reacting solid particles of a first reactant with a gaseous second reactant, which comprises maintaining said gaseous reactant at a temperature above the softening temperature of said particles, entraining said particles in a carrier stream of inert gas having a temperature below said softening temperature, passing said inert gas and entrained particles into said gaseous reactant, whereby said particles are dispersed in said gaseous reactant and are reacted with and vaporized by said gaseous reactant and maintaining said inert gas and entrained particles at a temperature below the softening temperature of said solid particles substantially until said solid particles meet said gaseous reactant.

2. The method of producing phthalonitrile from phthalic acid, which comprises passing particulate-form solid acid selected from the group consisting of isophthalic and terephthalic acids into a stream of inert carrier gas maintained at a temperature below the softening temperature of said particulate-form solid acid, passing said inert carrier gas stream and entrained solid acid into contact with a stream of gaseous ammonia having a temperature sufficiently high to cause substantially immediate reaction and conversion to vapor of a substantial portion of said solid acid, passing the resulting ammonia-inert gas-acid stream into a reaction zone containing a dehydration catalyst, withdrawing a vapor-form effluent from said reaction zone, and recovering phthalonitrile from said effluent.

3. The method of producing phthalonitrile from phthalic acid, which comprises passing solid particles of at least one phthalic acid into a stream of inert carrier gas, passing said inert carrier gas stream and entrained particles into contact with a stream of gaseous ammonia having a temperature of from about 800° to 1000° F., maintaining the temperature of said inert carrier gas stream from the point of introduction of said particles therein to the juncture thereof with said gaseous ammonia stream at a temperature of from about 60° to 400° F., maintaining the resulting ammonia-inert gas-acid stream in a residence zone until all vaporizable materials in said stream are substantially completely converted to vapor, passing the resulting ammonia-inert gas-acid vapor stream into a reaction zone containing a dehydration catalyst under such conditions that said acid will react to phthalonitrile, withdrawing a phthalonitrile-containing vapor-form effluent from said reaction zone, and recovering phthalonitrile from said effluent.

4. An apparatus for contacting at least one solid particulate-form reactant with a confined, hot, moving reactant gas stream maintained at a temperature sufficiently high to cause substantially immediate vaporization of a substantial proportion of said solid reactant, which comprises a solid particulate-form reactant source and an inert gas source connected to an inert gas conduit, a reactant gas stream conduit confining said hot, moving reactant gas stream, said inert gas conduit intersecting said reactant gas conduit, means for passing said solid particulate-form reactant from said solid particulate-form reactant source into said inert gas conduit and entraining said solid particulate-form reactant therein, passing said inert gas and entrained solid particulate-form reactant from said inert gas conduit into said reactant gas stream conduit, and cooling means comprising a fluid cooled jacket on said inert gas conduit substantially to the point where said inert gas conduit intersects said reactant gas stream conduit whereby said inert gas and entrained solid particulate-form reactant are maintained at a temperature below the threshold melting temperature of said solid particulate-form reactant.

References Cited in the file of this patent

UNITED STATES PATENTS

| | | |
|---|---|---|
| 2,678,941 | Ferstandig | May 18, 1954 |
| 2,773,891 | Toland et al. | Dec. 11, 1956 |
| 2,788,361 | Wettstein et al. | Apr. 9, 1957 |